(12) United States Patent
Nakata et al.

(10) Patent No.: US 6,278,666 B1
(45) Date of Patent: Aug. 21, 2001

(54) MAGNETO-OPTICAL DISK RECORDING AND REPRODUCING DEVICE

(75) Inventors: Hideki Nakata, Nara; Hideki Aikoh, Higashiosaka; Yutaka Murakami, Hirakata; Kenichi Miyamori, Toyonaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/161,019

(22) Filed: Sep. 25, 1998

(30) Foreign Application Priority Data

Sep. 29, 1997 (JP) ..................................... 9-264495

(51) Int. Cl.$^7$ ....................................... G11B 11/00
(52) U.S. Cl. ........................................ 369/13; 369/112.01
(58) Field of Search .............................. 369/13, 112, 114, 369/112.01; 360/59, 114

(56) References Cited

U.S. PATENT DOCUMENTS

| | | | |
|---|---|---|---|
| 5,022,018 | 6/1991 | Vogelgesang | 369/130 R |
| 5,105,408 * | 4/1992 | Lee et al. | 369/13 X |
| 5,124,961 * | 6/1992 | Yamaguchi et al. | 369/130 R |
| 5,392,263 * | 2/1995 | Watanabe et al. | 369/114 X |
| 5,831,797 * | 11/1998 | Schaenzer et al. | 369/13 X |
| 5,881,042 * | 3/1999 | Knight | 369/112 X |
| 5,886,959 * | 3/1999 | Bischoff et al. | 369/114 X |
| 6,055,220 * | 4/2000 | Mamin et al. | 369/112 |
| 6,064,632 * | 5/2000 | Nakaoki et al. | 369/114 X |
| 6,069,853 * | 5/2000 | Novotny et al. | 369/112 X |

FOREIGN PATENT DOCUMENTS

| | | |
|---|---|---|
| 4-330656 | 11/1992 | (JP) . |
| 7-64438 | 1/1995 | (JP) . |
| 7-311992 | 11/1995 | (JP) . |

OTHER PUBLICATIONS

Patent Abstracts of Japan, Publication No. 04330656A, dated Nov. 11, 1992.
Patent Abstracts of Japan, Publication No. 07006438A, dated Jan. 10, 1995.
Patent Abstracts of Japan, Publication No. 07311992A, dated Nov. 28, 1995.

* cited by examiner

*Primary Examiner*—Aristotelis M. Psitos
(74) *Attorney, Agent, or Firm*—Rosenthal & Osha, L.L.P.

(57) ABSTRACT

In the magneto-optical disk recording and reproducing device, a coil 26a, which serves as a magnetomotive force source is located in the peripheral region of the object lens 5a. A yoke 27a that is a magnetic flux inducing means made of magnetic material serves as the object lens holder. According to this magneto-optical disk recording and reproducing device, even if the object lens is displaced in the radial direction of the information recording medium due to the decentering of the information recording medium or the like, the dislocation of the yoke and coil relative to the object lens is inhibited, stable magnetic field strength is maintained, highly precise recording can be realized, and devices having a small size and thin shape can be realized.

8 Claims, 10 Drawing Sheets

MAGNETO-OPTICAL DISK RECORDING AND REPRODUCING DEVICE

FIELD OF THE INVENTION

The present invention relates to a magneto-optical disk recording and reproducing device using a disk type magneto-optical media. More specifically, it relates to an optical head and a magnetic head of the magneto-optical disk recording and reproducing device.

BACKGROUND OF THE INVENTION

Recently, disk recording and reproducing devices have been used for various applications, for example, DVD, MD, CD, CD-ROM, etc., and devices having a high density, small size, high performance, high quality, and high added value have been demanded. In particular, in the magneto-optical disk recording and reproducing device using a magneto-optical media capable of recording, the demands of devices for data and devices for image-recording tend to greatly increase. Consequently devices having a small size, thin shape, high performance and high recording density have been increasingly demanded.

Hitherto, a great deal of investigations concerning the techniques of an optical head and magnetic head for a magneto-optical disk has been reported.

Hereinafter, a conventional magneto-optical head and magnetic head for magneto-optical disk will be described with reference to the drawings.

FIG. 8 is a schematic view showing a light path of a conventional magneto-optical disk recording and reproducing device.

As shown in FIG. 8, the light beam irradiated from a semiconductor laser 1 is converted into a parallel light beam by a collimator lens 2 and is separated into a plurality of different parallel light fluxes by a diffraction grating 3. A plurality of different parallel light fluxes pass through a beam splitter 4a of a composite element 4 and are converged on an information recording medium 6 having a magneto-optical effect as a main beam. The main beam has a diameter of about 1 μm by means of an object lens 5 incorporated in an object lens holder 33 (see FIG. 10). At the same time, a preceding beam and a following beam as sub-beams are produced at constant intervals in front of and behind the main beam on the same track as that of the main beam by so-called three-beam method.

Moreover, a parallel light flux reflected from the beam splitter 4a of the composite element 4 is incident on a light receiving element 7 for monitoring, and thereby the driving current of the semiconductor laser 1 is controlled.

The light beam reflected from the information recording medium 6 travels in the opposite direction, is reflected from and splitted by the beam splitter 4a of the composite element 4 and then is incident on a polarization separating element 4b of the composite element 4. The semiconductor laser 1 is provided in such a way that the polarization direction of the laser beam is parallel with respect to the paper. The polarization direction of the incident light beam is rotated by 45°, and then the incident light beam is separated into three different fluxes having two polarization components crossing at right angles by the polarization separating element 4b, and then reflected from a mirror 4c of the composite element 4.

The reflected light beam that passes through the composite element 4 is incident on a cylindrical-shaped convex lens 8 to form a convergent light beam. Then, the convergent light beam is incident on a concave cylindrical lens 9. Herein, the concave cylindrical lens 9 is provided in such a way that the lens effect is exhibited in the direction of approximately 45° with respect to the image of the recording track of the information recording medium 6 that is present in the direction of W1 in a plane being parallel to the paper.

The light beam that passes through the concave cylindrical lens 9 generates astigmatism, which is an error signal detected by a focus error signal detecting means. The light beam being incident on a plane that does not have the lens effect of the concave cylindrical lens 9 passes through an optical path shown by solid lines and is converged in a focal point 12. On the other hand, the light beam being incident on a plane that has the lens effect of the concave cylindrical lens 9 passes through an optical path shown by broken lines and is converged in a focal point 13.

A multi-divided photo-detector 10 is located in such a way that its light receiving face is approximately midway between the focal point 12 and the focal point 13.

The magnetic head is located above the information recording medium 6. The electric current is applied to the coil 26 from the current applying means 29, and thereby the magnetic field is generated.

FIG. 9 is a schematic view showing a multi-divided photo-detector and a signal detecting circuit.

As shown in FIG. 9, the multi-divided photo-detector 10 comprises a quadrant region 19 of receiving light beam, a region 20 of receiving preceding beam, a region 21 of receiving following beam, and regions 22a and 22b of receiving information signals. These light receiving regions are connected to a subtractor 23 and an adder 24. Herein, the quadrant region 19 of receiving light beam receives a light spot 16 of the main beam (P+S polarization), the region 22a of receiving information signals receives a light spot 15 of the main beam (S polarization), the region 22b of receiving information signals receives a light spot 14 of the main beam (P polarization), the region 20 of receiving preceding beam receives a light spot 17 of the preceding beam of the sub-beams, and the region 21 of receiving following beam receives a light spot 18 of the following beam of the sub-beams, respectively.

The focus error signal is detected by so-called astigmatism method. In the astigmatism method, the sums of electric signals generated at two diagonals of the quadrant region 19 of receiving light beam of the central part are calculated, and then the difference thereof is calculated. The tracking error detection signal is detected by so-called three-beam method. In the three-beam method, the difference between the light spot 17 of the preceding beam and the light spot 18 of the following beam is calculated. Furthermore, the magneto-optical disk information signal can be detected by the differential detection method. In the differential detection method, the difference between the main beam 14 comprising P polarization and the main beam 15 comprising S polarization is calculated. Furthermore, by calculating the sums thereof, a prepit signal also can be detected.

FIG. 10 is a schematic view showing a configuration of a conventional disk recording and reproducing device.

As shown in FIG. 10, the object lens 5 located below the information recording medium 6 is held by the object lens holder 33. The object lens holder 33 is fixed to an optical housing 11 using an object lens driving device 32. On the other hand, a coil 26, a yoke 27 and a slider 30 that are located above the information recording medium 6 are precisely fixed to the optical housing 11 using a suspension 28 and a suspension holder 31. The optical housing 11 can be moved in the radial direction of the information recording medium 6 by means of a carrying means 34 such as a ball screw. Moreover, the information recording medium 6 can be rotated by a spindle motor 25.

When signals are recorded on the information recording medium 6, the coil 26 and yoke 27 are held at a predetermined distance from the surface of the information recording medium 6 by the spring pressure of the suspension 28. Subsequently, in a state where the temperature on the information recording medium 6 is increased by light spot, electric current is applied to the coil 26 by a current applying means 29 (see FIG. 8). Thus, the vertical magnetic field is generated in accordance with the direction of the applied current and the vertical magnetic field is provided to the information recording medium 6 by the magnetic circuit comprising the yoke 27. Thus, the signals are recorded on the information recording medium 6.

However, in the above-mentioned conventional structure, in a case where the object lens 5 is displaced in the radial direction of the information recording medium 6 due to the decentering of the information recording medium 6 or a tracking follow-up servo by only the object lens driving device 32, or in a case where the object lens 5 is displaced due to the self-weight displacement of the object lens driving device 32, etc., the position of the coil 26 and the yoke 27 is displaced relative to the position of the object lens 5. As a result, the magnetic field strength is lowered and the recording performance is greatly deteriorated. Moreover, because the entire magnetic head is located opposite to the object lens 5 and the information recording medium 6 is sandwiched between the magnetic head and the object lens 5, as the radius of the information recording medium 6 is increased, the size of the suspension 28 is increased. As a result, it is difficult to realize devices having a small size and thin shape.

SUMMARY OF THE INVENTION

It is therefore an object of the present invention to provide a high performance and high quality magneto-optical disk recording and reproducing device in which the stable magnetic field strength is maintained, highly precise recording can be realized, and devices having a small size and thin shape can be realized by inhibiting the dislocation of the object lens relative to the location of the yoke and coil, even if the object lens is displaced in the radial direction of the information recording medium due to the decentering of the information recording medium, or the like.

In order to achieve the above-mentioned objects, a magneto-optical disk recording and reproducing device of the present invention comprises an information recording medium having a magneto-optic effect, an object lens converging light beam on the information recording medium, a magnetic field generating means being integrated with the object lens and applying magnetic field for recording signals to the information recording medium, a holding member holding the object lens, and an electric current applying means applying electric current for generating magnetic field to the magnetic field generating means. According to such a configuration of the magneto-optical disk recording and reproducing device, even if the object lens is displaced in the radial direction of the information recording medium due to the decentering of the information recording medium or due to the tracking follow-up servo only by the object lens driving device, or even if the object lens is displaced due to the self-weight displacement of the object lens driving device, since the object lens and the magnetic field generating means, such as, a yoke, a coil, etc. are integrally displaced, the relative dislocation between light spot and magnetic flux can be inhibited. As a result, the magnetic field strength is not deteriorated. Thus, since stable magnetic field strength can be maintained, highly precise recording can be realized. Furthermore, since magnetic field generating means is integrated with the object lens, the suspension and suspension holder of a conventional magnetic head is not necessary. Thus, the size of the magneto-optical disk recording and reproducing device can be made smaller and thinner.

In the above-mentioned magneto-optical disk recording and reproducing device, it is preferable that the magnetic field generating means comprises a magnetomotive force source generating the magnetic field and a magnetic flux inducing means inducing the magnetic flux. According to such a preferred configuration, the magnetic field strength can be improved and the recording performance of the magneto-optical disk recording and reproducing device can be enhanced.

Further, in this case, it is preferable that any one of the magnetomotive force source, the flux inducing means, and the holding member intercepts the central part of the light flux being incident on the object lens and generates so-called optical superresolution. According to such a preferred configuration, the diameter of the light spot can be further reduced, so that higher density recording and reproducing can be realized. As a result, the magneto-optical disk recording and reproducing device that is excellent in both the recording and reproducing performance and the recording density can be realized.

Further, in this case, it is preferable that the magnetic flux inducing means serves as the holding member. According to such a preferred configuration, the assembly accuracy can be improved and low cost can be realized.

Further, in this case, the magnetomotive force source is provided at the entire peripheral region of the object lens. According to such a preferred configuration, the magnetic force can be improved and the recording performance of the magneto-optical disk recording and reproducing device can be enhanced.

Further, in this case, it is preferable that the magnetomotive force source is a thin plate current-carrying body. According to such a preferred configuration, the magneto-optical disk recording and reproducing device can be further miniaturized. In this case, it is still further preferable that the thin plate current-carrying body is formed on any one of the object lens, the magnetic flux inducing means and the holding member by printing, application or adhesion. According to such a preferred configuration, the magneto-optical disk recording and reproducing device that is excellent in quantity production can be realized.

Further, in this case, it is preferable that the magnetic flux inducing means is provided on the surface of the information recording medium. According to such a preferred configuration, the magnetic field strength on the information recording medium can greatly be improved and the information recording and reproducing performance can greatly be enhanced.

In the above-mentioned magneto-optical disk recording and reproducing device, it is preferable that the magnetic field generating means consists of only magnetomotive force source generating the magnetic field. According to such a preferred configuration, the magneto-optical disk recording and reproducing device can be further miniaturized.

Further, in this case, it is preferable that either the magnetomotive force source or the holding means intercepts the central part of the light flux being incident on the object lens and generates so-called optical superresolution.

Further, in this case, it is preferable that the magnetomotive force source is provided on the entire peripheral region of the object lens.

Further, in this case, it is preferable that the magnetomotive force source is a thin plate current-carrying body. In this case, it is further preferable that the thin plate current-carrying body is formed either on the object lens or on the holding member by printing, application or adhesion.

BRIEF DESCRIPTION OF THE DRAWINGS

FIG. 2(*b*) is a cross sectional view taken along the line I—I of FIG. 2 (*a*).

FIG. 2(*c*) is a bottom view showing an optical head in a first embodiment according to the present invention.

FIG. 4(*b*) is a cross sectional view taken along the line II—II of FIG. 4 (*a*).

FIG. 4(*c*) is a bottom view showing an optical head in a second embodiment according to the present invention.

FIG. 5(*b*) is a cross sectional view taken along the line III—III of FIG. 5(*a*).

FIG. 5(*c*) is a bottom view showing an optical head in a second embodiment of the present invention.

FIG. 6(*b*) is a cross sectional view taken along the line IV—IV of FIG. 6(*a*).

FIG. 6(*c*) is a bottom view showing an optical head in a third embodiment according to the present invention.

DETAILED DESCRIPTION OF THE INVENTION

Figure 1:
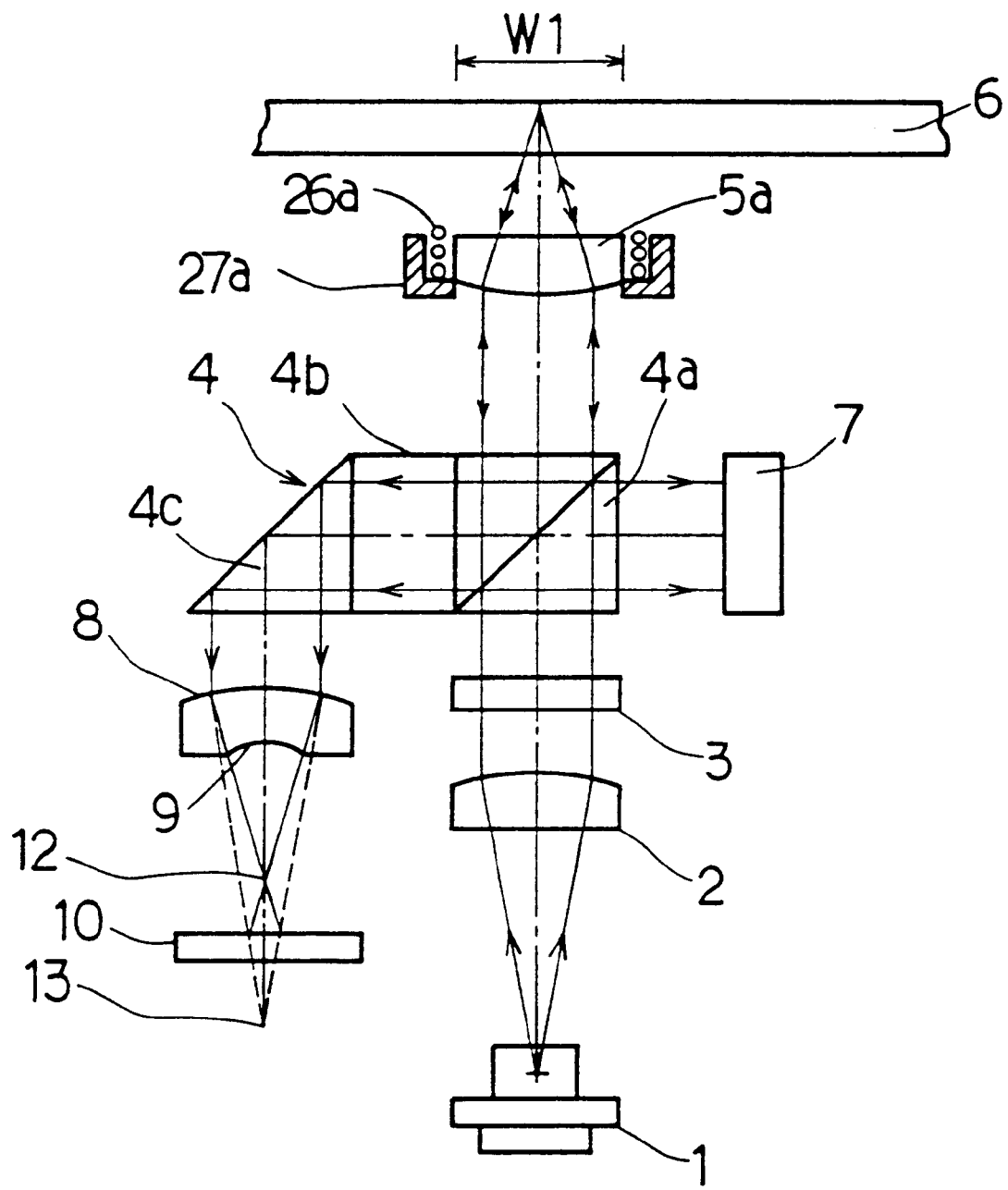
FIG. 1 is a schematic view showing an optical path of a magneto-optical disk recording and reproducing device in a first embodiment according to the present invention.
Figure 8:
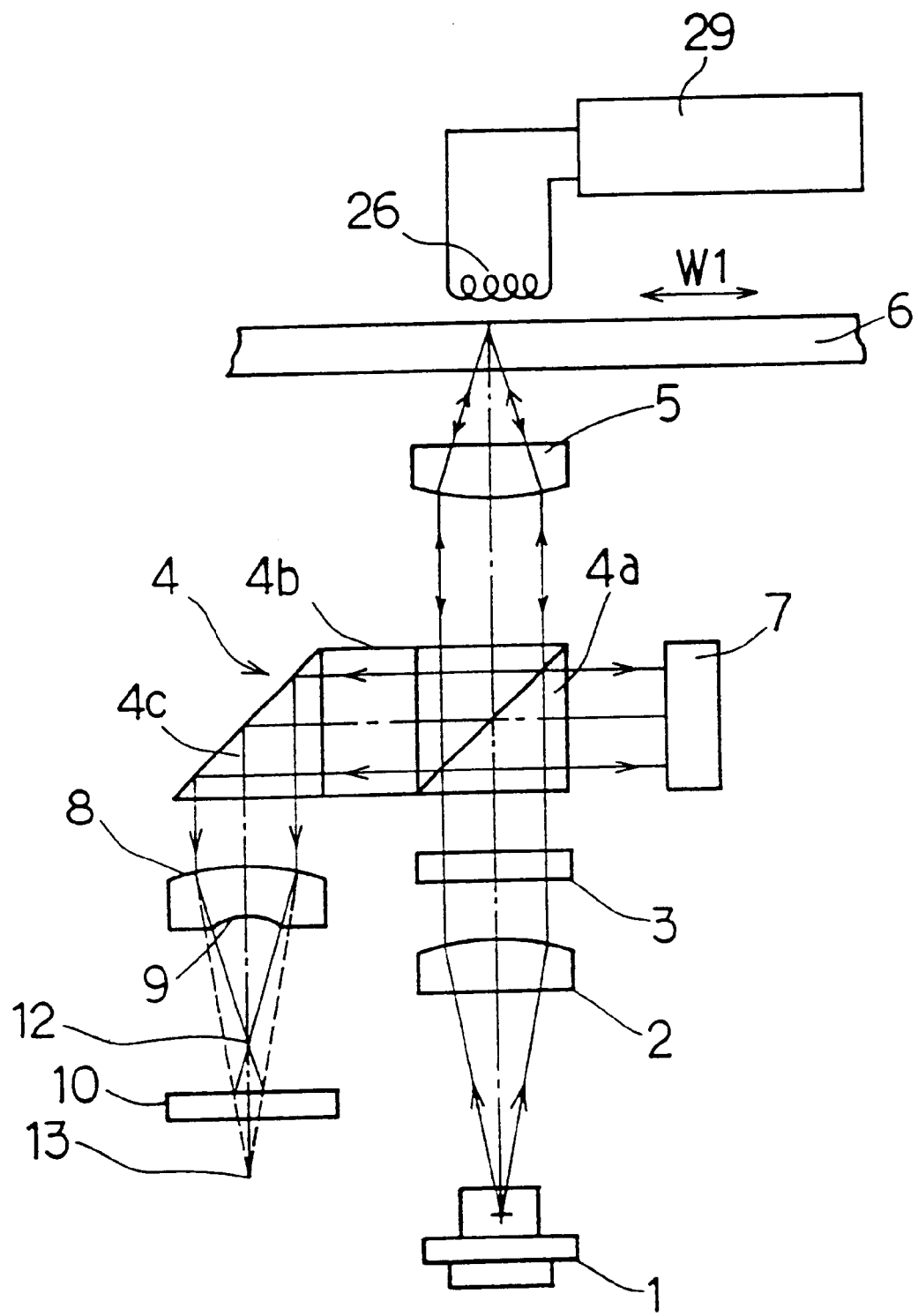
FIG. 8 is a schematic view showing an optical path of a conventional disk recording and reproducing device.
Figure 9:
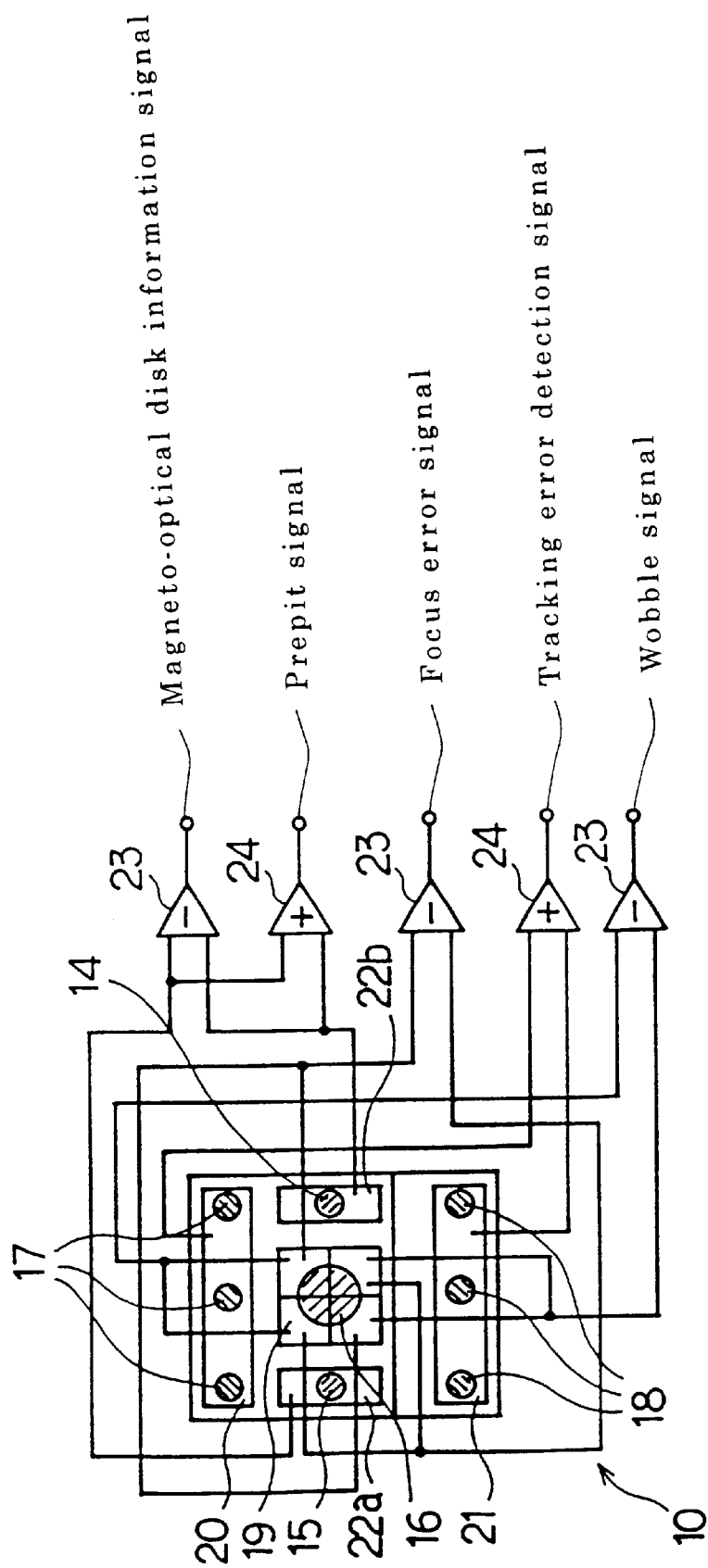
FIG. 9 is a schematic view showing a multi-divided photo-detector and a signal detecting circuits of the present invention and of the prior art.

Hereinafter, the present invention will be described more specifically by way of its preferred embodiments with reference to the accompanying drawings.
First Embodiment FIG. 1 is a schematic view showing an optical path of a magneto-optical disk recording and reproducing device in a first embodiment according to the present invention. The configuration of the light path in this embodiment is the same as that of the conventional magneto-optical disk recording and reproducing device described with reference to FIG. 8. However, unlike the conventional magneto-optical disk recording and reproducing device, a coil 26*a* which serves as a magnetomotive force source is located at the peripheral region of an object lens 5*a*. A yoke 27*a* which serves as a magnetic flux inducing means is made of magnetic materials, such as sintered alloy, SPCC, iron, etc. and also serves as an object lens holder. Moreover, as a means for detecting various kinds of signals by the multi-divided photo-detector 10 of the present invention, the same detecting means as the conventional detecting means of FIG. 9 is used.

Figure 2A:
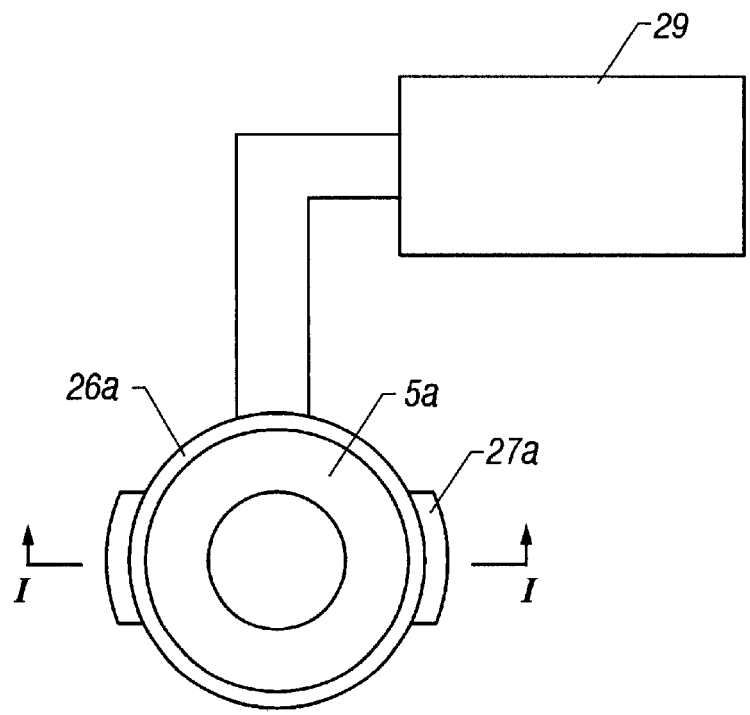
FIG. 2(*a*) is a plan view showing an optical head in a first embodiment according to the present invention.
Figure 2B:
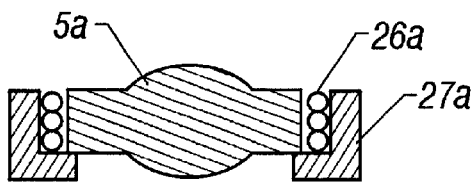
Figure 2C:
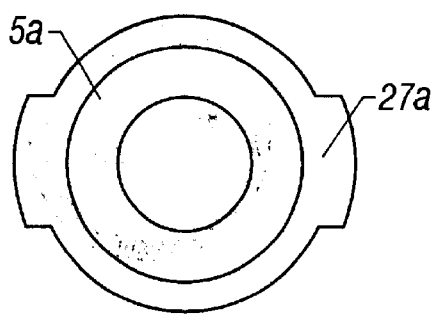

FIGS. 2(*a*) to (*c*) are schematic views showing the optical head in this embodiment. FIG. 2(*a*) is a plan view, FIG. 2(*b*) is a cross sectional view taken along the line I—I of FIG. 2(*a*) and FIG. 2(*c*) is a bottom view.

As shown in FIG. 2, the coil 26*a* is located in the peripheral region of the object lens 5*a*. An electric current applying means 29 is electrically connected to the coil 26*a*, and thereby electric current is applied on the coil 26*a* by the current applying means 29 and the magnetic field can be generated. Moreover, the object lens 5*a* having the coil 26*a* on its peripheral region is held by the yoke 27*a* that serves as the object lens holder.

Figure 3:
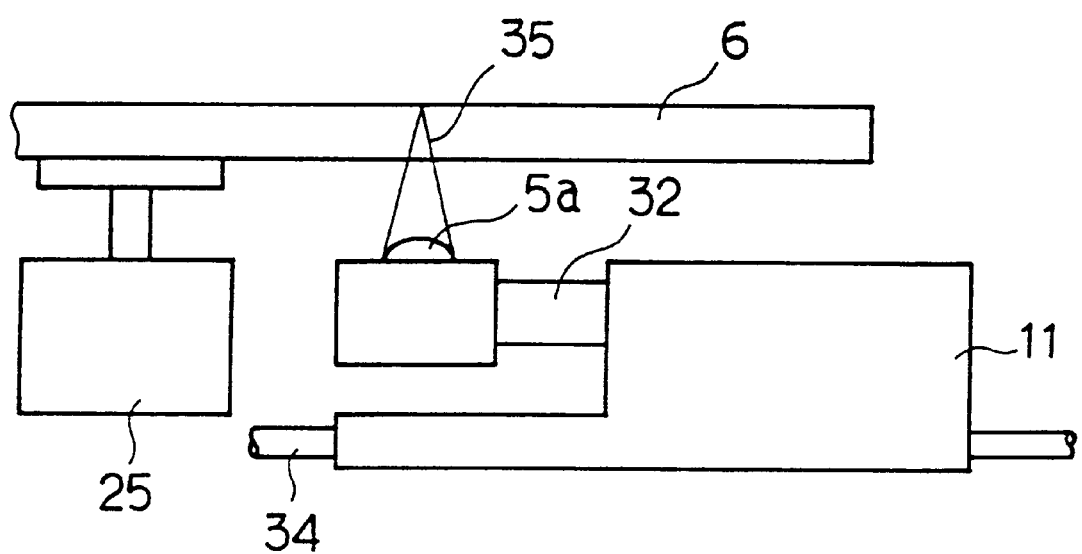
FIG. 3 is a schematic view showing a configuration of a magneto-optical disk recording and reproducing device in a first embodiment according to the present invention.

FIG. 3 is a schematic view showing a configuration of an optical head and magnetic head in this embodiment according to the present invention.

As shown in FIG. 3, the object lens 5*a* having the coil 26*a* in its peripheral region (see FIGS. 1 and 2) is fixed to the optical housing 11 using the object lens driving device 32. The optical housing 11 can be moved in the radial direction of the information recording medium 6 by a carrying means 34.

Information is recorded on the information recording medium 6 as follows: electric current is applied to the coil 26*a* by the current applying means 29 in a state where the temperature of the information recording medium 6 is risen by the light spot from the object lens 5*a*, and thereby the vertical magnetic field is generated in accordance with the direction of the electric current. Then, information recording medium 6 is provided with the vertical magnetic field by the magnetic circuit comprising the yoke 27*a*, and thereby the information is recorded on the information recording medium 6.

Figure 10:
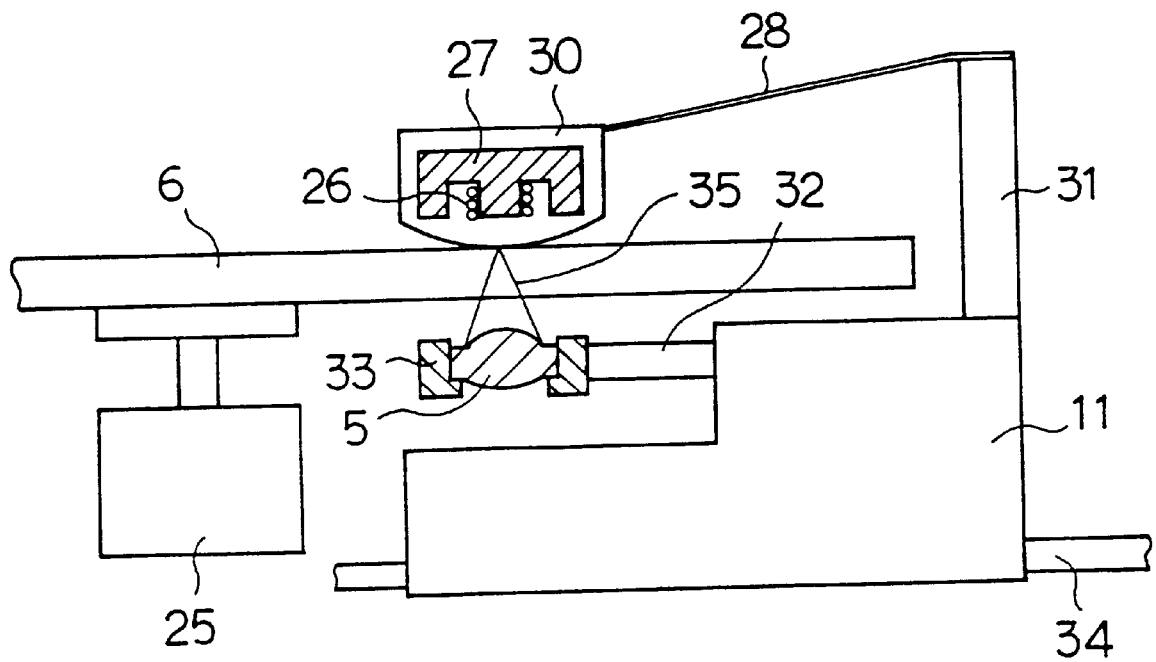
FIG. 10 is a schematic view showing a configuration of a conventional disk recording and reproducing device.

As mentioned above, according to this embodiment, even if the object lens 5*a* is displaced in the radial direction of the information recording medium 6 due to the decentering of the information recording medium 6 or tracking follow-up servo only by the object lens driving device 32, or even if the object lens 5*a* is displaced due to the self-weight of the object lens driving device 32, since the object lens 5*a*, the coil 26*a*, and the yoke 27*a*, which serves as the magnetic field generation means are integrally displaced, the relative dislocation between the light spot and the magnetic flux can be inhibited. As a result, the magnetic field strength is not deteriorated. Thus, stable magnetic field strength can be maintained and highly precise recording can be realized. Moreover, since the coil 26*a* and yoke 27*a* as the magnetic generating means are integrated with the object lens 5*a*, the suspension 28 and suspension holder 31 (See FIG. 10) constituting a conventional magnetic head is not necessary. Consequently, the magneto-optical disk recording and reproducing device having a small size and thin shape can be realized.

Moreover, in this embodiment, the yoke 27*a*, which serves as a magnetic flux inducing means, also serves as an object lens holder. However, the device is not limited to this configuration alone, and other configurations may be employed, for example, the object lens holder may be provided as the different member.

Second Embodiment

Next, the second embodiment of the present invention will be described with reference to the FIG. 4.

Figure 4A:
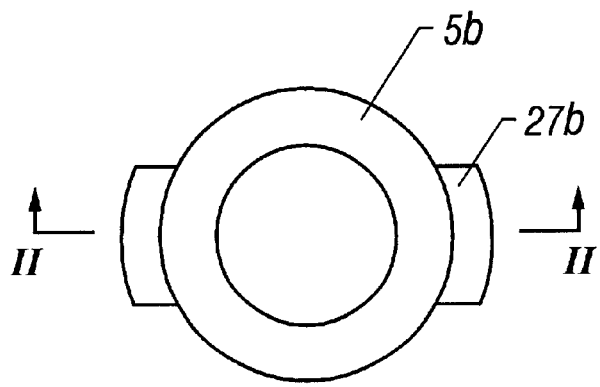
FIG. 4(*a*) is a plan view showing an optical head in a second embodiment according to the present invention.
Figure 4B:
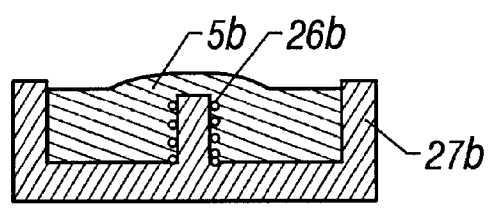
Figure 4C:
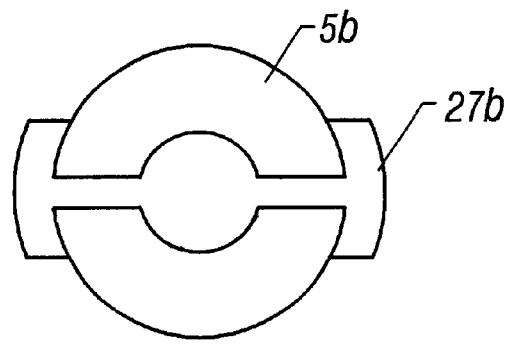

FIGS. 4(a) to (c) are schematic views showing the optical head in this embodiment. FIG. 4(a) is a plan view, FIG.4(b) is a cross sectional view taken along the line II—II of FIG. 4(a) and FIG. 4(c) is a bottom view.

As shown in FIG. 4, unlike the first embodiment, only the central part of the light fluxes being incident on the objectless 5b is intercepted by the coil 26b and yoke 27b. The other configuration is the same as the first embodiment.

According to such a configuration, so-called optical superresolution can be generated. Therefore, the diameter of the light spot can be further reduced, so that higher density recording and reproducing can be realized. As a result, the magneto-optical disk information recording and reproducing device that is excellent in both the recording and reproducing performance and recording density can be realized.

Figure 5A:
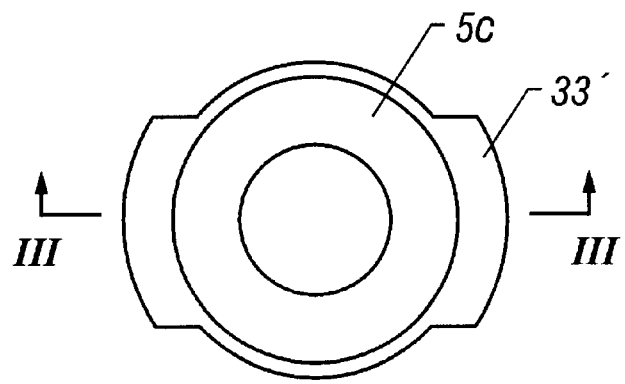
FIG. 5(*a*) is a plan view showing an another optical head in a second embodiment according to the present invention.
Figure 5B:
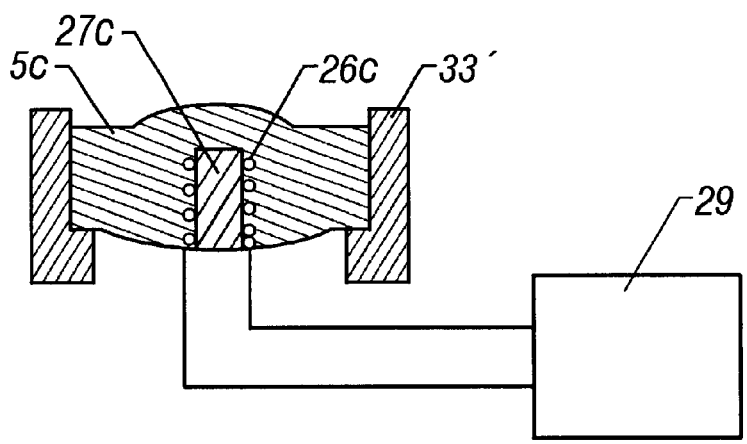
Figure 5C:
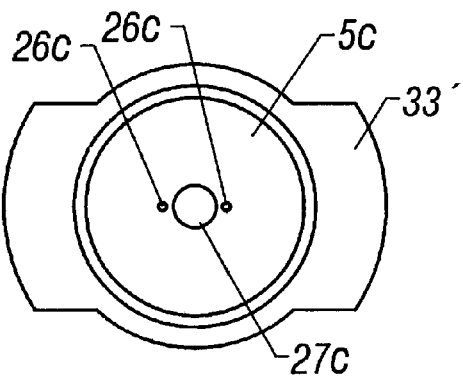

Moreover, in this embodiment, light lens is intercepted by the coil 26b and yoke 27b. However, the configuration is not limited to this alone. For example, as shown in FIG. 5, an objective lens holder 33' and a yoke 27c may be formed from the different members, and only the yoke 27c and coil 26c may be collected in the central part of the object lens 5c, and thereby the optical superresolution effect is obtained. Moreover, in the same configuration of the coil and yoke as FIG. 2, an additional object lens holder may be provided and the function of intercepting the light beam of the central part of the object lens may be provided with the object lens holder.

Third Embodiment

Next, the third embodiment of the present invention will be described with reference to the FIG. 6.

Figure 6A:
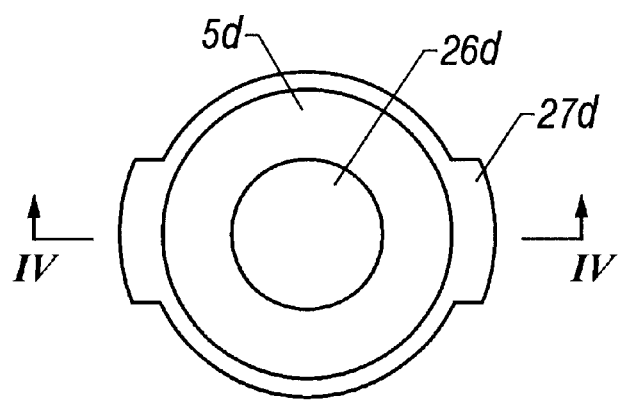
FIG. 6(*a*) is a plan view showing an optical head in a third embodiment according to the present invention.
Figure 6B:
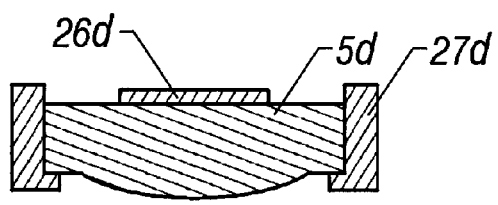
Figure 6C:
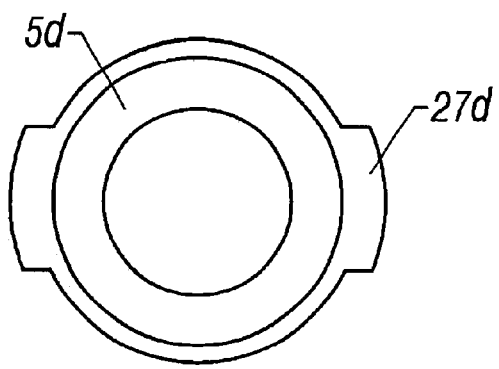

FIGS. 6(a) to (c) are schematic views showing the optical head in this embodiment. FIG. 6(a) is a plan view, FIG. 6(b) is a cross sectional view taken along the line IV—IV of FIG. 6(a) and FIG. 6(c) is a bottom view.

As shown in FIG. 6, unlike the second embodiment, the coil 26d is formed on the central part of the object lens 5d by printing the copper foil etc. The other configuration is the same as that of the second embodiment.

According to such a configuration, the magneto-optical disk recording and reproducing device that can be miniaturized and is excellent in quantity production can be realized.

Moreover, in this embodiment, the coil 26d is formed on the object lens 5d by printing. However, the configuration is not limited to this alone. For example, the thin plate type coil may be adhered to the object lens 5d or a coil may be formed by spraying a conductive material onto the object lens 5d. Also, a coil may be formed by etching a conductive material. Furthermore, a coil may be obtained by combining the thin plate coil with the object lens.

Moreover, in this embodiment, the coil 26d is formed on the object lens 5d. However, the configuration is not limited to this alone. For example, the coil 26d may be formed on the yoke 27d.

Moreover, in the first to third embodiments, the magnetic field generating means comprises the coil as a magnetomotive force source for generating the magnetic field and the yoke as a magnetic flux inducing means inducing the magnetic flux. However, the yoke as a magnetic flux inducing means is not always needed. By removing the yoke as the magnetic flux inducing means, the magneto-optical disk recording and reproducing device can be further miniaturized.

Fourth Embodiment

Next, the fourth embodiment of the present invention will be described with reference to the FIG. 7.

Figure 7:
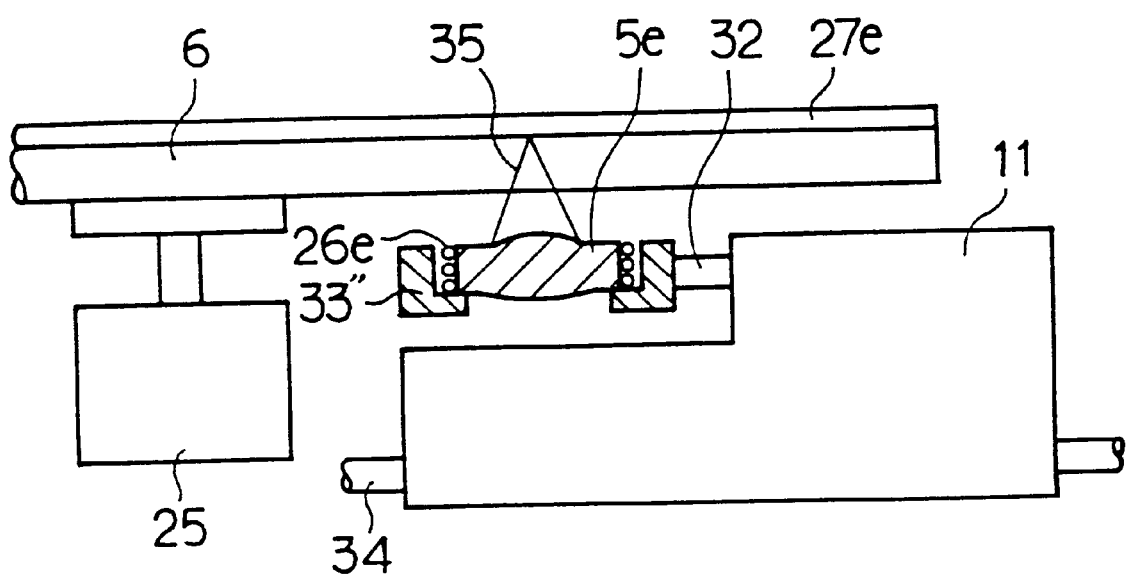
FIG. 7 is a schematic view showing a configuration of a magneto-optical disk recording and reproducing device in a fourth embodiment according to the present invention.

As shown in FIG. 7, unlike the first embodiment, the yoke 27e is provided on the surface of the information recording medium 6. The other configuration is the same as that of the first embodiment.

According to such a configuration, the magnetic field strength on the information recording medium 6 can be greatly improved and the recording and reproducing performance can be greatly enhanced.

Moreover, in this embodiment, the coil 26e is provided in the periphery region of the object lens 5e, however, the configuration is not limited to this alone. For example, as in the configuration of the third embodiment (See FIG. 6), the coil 26e may be provided on the central part of the object lens.

Finally, it is understood that the invention may be embodied in other specific forms without departing from the spirit or essential characteristics thereof. The embodiments disclosed in this application are to be considered in all respects as illustrative and not restrictive, so that the scope of the invention are indicated by the appended claims rather than by the foregoing description, and-all changes which come within the meaning and range of equivalency of the claims are intended to be embraced therein.

What is claimed is:

1. A magneto-optical disk recording device, comprising:

an information recording medium having a magneto-optic effect;

an object lens arranged to converge a light beam on said information recording medium;

a magnetic field generating means for applying a magnetic field to said information recording medium;

a holding member holding said object lens; and an electric current applying means for applying electric current to said magnetic field generating means; wherein said magnetic field generating means comprises a magnetomotive force source generating the magnetic field and a magnetic flux inducing means for inducing the magnetic flux, and the magnetic flux inducing means is provided on a surface of the information recording medium.

2. The device according to claim 1, wherein any one of the magnetomotive force source, the flux inducing means, and the holding member intercepts a central part of the light flux that is incident on the object lens and generates optical superresolution.

3. The device according to claim 1, wherein the magnetic flux inducing means serves as the holding member.

4. The device according to claim 1, wherein the magnetomotive force source is provided at an entire peripheral region of the object lens.

5. The device according to claim 1, wherein the magnetomotive force source is a thin plate current-carrying body.

6. The device according to claim 5, wherein said thin plate current-carrying body is formed on said object lens by printing a conductive material onto said object lens.

7. The device according to claim 5, wherein said thin plate current-carrying body is formed on the object lens by applying a conductive material onto the object lens.

8. The device according to claim 5, wherein said thin plate current-carrying body is formed on the object lens by adhering a conductive material onto the object lens.

* * * * *

UNITED STATES PATENT AND TRADEMARK OFFICE
CERTIFICATE OF CORRECTION

PATENT NO.   : 6,278,666 B1
DATED        : August 21, 2001
INVENTOR(S)  : Hideki Nakata et al.

It is certified that error appears in the above-identified patent and that said Letters Patent is hereby corrected as shown below:

<u>Title page,</u>
Item [54], change "MAGNETO-OPTICAL DISK RECORDING AND REPRODUCING DEVICE" to -- MAGNETO-OPTICAL DISK RECORDING DEVICE WITH INTEGRATED MAGNETIC FIELD GENERATING MEANS --

Signed and Sealed this

Thirty-first Day of December, 2002

JAMES E. ROGAN
*Director of the United States Patent and Trademark Office*